(12) United States Patent
Um et al.

(10) Patent No.: US 9,786,064 B2
(45) Date of Patent: Oct. 10, 2017

(54) MULTI-CAMERA CONTROL APPARATUS AND METHOD TO MAINTAIN LOCATION AND SIZE OF OBJECT IN CONTINUOUS VIEWPOINT SWITCHING SERVICE

(71) Applicant: Electronics and Telecommunications Research Institute, Daejeon (KR)

(72) Inventors: Gi Mun Um, Daejeon (KR); Kwang Yong Kim, Daejeon (KR); Yoo Kyung Kim, Daejeon (KR); Won Ryu, Seoul (KR); Il Gu Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 110 days.

(21) Appl. No.: 15/004,425

(22) Filed: Jan. 22, 2016

(65) Prior Publication Data
US 2016/0227128 A1 Aug. 4, 2016

(30) Foreign Application Priority Data
Jan. 29, 2015 (KR) .................. 10-2015-0014096

(51) Int. Cl.
*G06T 7/60* (2017.01)
*H04N 5/232* (2006.01)
(Continued)

(52) U.S. Cl.
CPC ............ *G06T 7/60* (2013.01); *G06K 9/00771* (2013.01); *G06T 1/0014* (2013.01);
(Continued)

(58) Field of Classification Search
CPC .......... H04N 7/18; H04N 7/181–7/188; H04N 5/23296; H04N 5/232; H04N 5/247; H04N 5/23203; H04N 5/23219; H04N 5/23238; H04N 5/2258; H04N 5/23216; H04N 21/21805; H04N 21/4223; G08B 13/19608; G08B 13/19643; G08B 13/19689;
(Continued)

(56) References Cited

U.S. PATENT DOCUMENTS 7,193,645 B1 *  3/2007  Aagaard ................ H04N 5/222
                                                                348/157
8,115,814 B2 *  2/2012  Iwase ............... G08B 13/19608
                                                                345/427
(Continued)

*Primary Examiner* — Michael Osinski
(74) *Attorney, Agent, or Firm* — William Park & Associates Ltd.

(57) ABSTRACT

A multi-camera control apparatus and method to maintain a location and a size of an object in a continuous viewpoint switching service are provided. The multi-camera control method of controlling a main camera configured to capture a moving object of interest and controlling at least one sub-camera configured to capture the object of interest at a different viewpoint from that of the main camera, may include extracting the object of interest from a first image generated by the main camera, controlling a capturing scheme of the main camera based on a change in a location and a size of the extracted object of interest, projecting the object of interest onto a second image generated by the sub-camera, and controlling a capturing scheme of the sub-camera based on a change in a location and a size of the projected object of interest.

20 Claims, 7 Drawing Sheets

(51) Int. Cl.
  *H04N 5/225* (2006.01)
  *H04N 5/222* (2006.01)
  *H04N 5/247* (2006.01)
  *H04N 9/31* (2006.01)
  *G06K 9/00* (2006.01)
  *G06T 1/00* (2006.01)
  *G08B 13/196* (2006.01)
  *G06T 7/70* (2017.01)

(52) U.S. Cl.
  CPC ....... *G08B 13/19641* (2013.01); *H04N 5/222* (2013.01); *H04N 5/2258* (2013.01); *H04N 5/23296* (2013.01); *H04N 5/247* (2013.01); *H04N 9/3185* (2013.01); *H04N 9/3194* (2013.01); *G06T 7/70* (2017.01)

(58) Field of Classification Search
  CPC ........ G08B 13/19628; G08B 13/19641; G08B 13/19645; G08B 13/19693; G06T 2207/30232; G06T 2207/30201; G06T 7/292; G06T 7/70; G06T 7/60; G06K 2009/3291; G06K 9/32; G06K 9/3216; G06K 9/3233; G06K 9/3241
  See application file for complete search history.

(56) References Cited

U.S. PATENT DOCUMENTS

| | | | |
|---|---|---|---|
| 9,615,064 B2 * | 4/2017 | Millar | H04N 7/181 |
| 2001/0019357 A1 * | 9/2001 | Ito | G08B 13/19604 |
| | | | 348/152 |
| 2002/0005902 A1 * | 1/2002 | Yuen | G08B 13/19643 |
| | | | 348/211.99 |
| 2002/0118286 A1 * | 8/2002 | Kanade | H04N 5/222 |
| | | | 348/222.1 |
| 2002/0145660 A1 * | 10/2002 | Kanade | G03B 41/00 |
| | | | 348/36 |
| 2003/0020814 A1 * | 1/2003 | Ono | H04N 5/225 |
| | | | 348/220.1 |
| 2005/0046626 A1 * | 3/2005 | Yoda | G06T 15/30 |
| | | | 345/419 |
| 2005/0052533 A1 * | 3/2005 | Ito | G08B 13/19608 |
| | | | 348/169 |
| 2005/0104958 A1 * | 5/2005 | Egnal | G01S 3/7864 |
| | | | 348/143 |
| 2005/0280708 A1 * | 12/2005 | Glenn | H04N 5/232 |
| | | | 348/157 |
| 2006/0056056 A1 * | 3/2006 | Ahiska | G08B 13/19608 |
| | | | 359/690 |
| 2006/0158534 A1 * | 7/2006 | Gotohda | H04N 5/232 |
| | | | 348/239 |
| 2006/0192887 A1 * | 8/2006 | Miyamaki | H04N 5/23203 |
| | | | 348/347 |
| 2007/0200933 A1 * | 8/2007 | Watanabe | G08B 13/19643 |
| | | | 348/211.11 |
| 2007/0291104 A1 * | 12/2007 | Petersen | G01S 3/7865 |
| | | | 348/14.01 |
| 2009/0028386 A1 * | 1/2009 | Michimoto | G06K 9/32 |
| | | | 382/103 |
| 2010/0157020 A1 | 6/2010 | Choi et al. | |
| 2010/0166256 A1 * | 7/2010 | Kmiecik | G01C 11/06 |
| | | | 382/103 |
| 2011/0090341 A1 | 4/2011 | Ikewada et al. | |
| 2011/0199487 A1 | 8/2011 | Husøy et al. | |
| 2011/0211096 A1 * | 9/2011 | Aagaard | H04N 7/181 |
| | | | 348/262 |
| 2011/0304730 A1 * | 12/2011 | Chen | G01S 3/7864 |
| | | | 348/143 |
| 2011/0310219 A1 * | 12/2011 | Kim | G08B 13/19643 |
| | | | 348/36 |
| 2012/0026328 A1 * | 2/2012 | Sethna | G06K 9/52 |
| | | | 348/143 |
| 2012/0120241 A1 * | 5/2012 | Lewis | G06T 7/2093 |
| | | | 348/154 |
| 2012/0154593 A1 | 6/2012 | Anderson | |
| 2012/0154599 A1 * | 6/2012 | Huang | H04N 5/232 |
| | | | 348/169 |
| 2012/0169882 A1 * | 7/2012 | Millar | H04N 7/181 |
| | | | 348/159 |
| 2013/0141525 A1 * | 6/2013 | Williams | H04N 7/00 |
| | | | 348/38 |
| 2013/0188070 A1 | 7/2013 | Lee et al. | |
| 2013/0329947 A1 * | 12/2013 | Wu | G06K 9/3241 |
| | | | 382/103 |
| 2014/0064558 A1 * | 3/2014 | Huang | G06T 7/248 |
| | | | 382/103 |
| 2014/0104376 A1 * | 4/2014 | Chen | G08B 13/19689 |
| | | | 348/36 |
| 2014/0314278 A1 * | 10/2014 | Tatsuzawa | G06K 9/00255 |
| | | | 382/103 |
| 2014/0327780 A1 * | 11/2014 | Herrli Anderegg | G08B 13/19645 |
| | | | 348/159 |
| 2014/0362246 A1 * | 12/2014 | Nakano | H04N 5/23206 |
| | | | 348/211.4 |
| 2015/0116502 A1 * | 4/2015 | Um | H04N 7/181 |
| | | | 348/169 |
| 2015/0334356 A1 * | 11/2015 | Kim | H04N 5/23219 |
| | | | 348/143 |
| 2016/0314365 A1 * | 10/2016 | Poledna | G06K 9/00805 |
| 2017/0163973 A1 * | 6/2017 | Aagaard | H04N 13/0296 |

* cited by examiner

CASE 1

CASE 2

MULTI-CAMERA CONTROL APPARATUS AND METHOD TO MAINTAIN LOCATION AND SIZE OF OBJECT IN CONTINUOUS VIEWPOINT SWITCHING SERVICE

CROSS-REFERENCE TO RELATED APPLICATION

This application claims the benefit of Korean Patent Application No. 10-2015-0014096, filed on Jan. 29, 2015, in the Korean Intellectual Property Office, the disclosure of which is incorporated herein by reference.

BACKGROUND

1. Field of the Invention

Embodiments relate to a multi-camera control apparatus and method to maintain a location and a size of an object in a continuous viewpoint switching service.

2. Description of the Related Art

A continuous viewpoint switching service refers to a technology of continuously switching a viewpoint of an object of interest by capturing the object of interest at different viewpoints using a plurality of cameras to provide multiple images.

U.S. Patent Publication No. 2012-0154593 titled "METHOD AND APPARATUS FOR RELATIVE CONTROL OF MULTIPLE CAMERAS" of Trace Optics Pty. Ltd. introduces a function of controlling a location or zooming of a sub-camera so that the sub-camera captures surroundings of an object of interest, for example, a stadium based on a location of the object of interest tracked by a main camera that captures the object of interest.

However, because the main camera and the sub-camera capture the object of interest at different locations, a size and a location of the object of interest included in an image acquired by the main camera may be different from a size and a location of the object of interest included in an image acquired by the sub-camera.

For example, when a plurality of images acquired by the main camera and the sub-camera are continuously switched, a location and a size of the object of interest included in each of the images may change, which may cause a viewpoint to unnaturally move.

Accordingly, there is a desire for a method for preventing a viewpoint from unnaturally moving due to a change in a location or a size of an object of interest included in each of a plurality of images when the viewpoint is continuously switched based on the images.

SUMMARY

Embodiments provide an apparatus and method for preventing a viewpoint from unnaturally moving due to a change in a location or a size of an object of interest included in each of a plurality of images when the viewpoint is continuously switched based on the images.

According to an aspect, there is provided a multi-camera control method of controlling a main camera and at least one sub-camera, the main camera being configured to capture a moving object of interest and the sub-camera being configured to capture the object of interest at a different viewpoint from that of the main camera, the multi-camera control method including extracting the object of interest from a first image generated by the main camera, controlling a capturing scheme of the main camera based on a change in a location and a size of the extracted object of interest, projecting the object of interest onto a second image generated by the sub-camera, and controlling a capturing scheme of the sub-camera based on a change in a location and a size of the projected object of interest.

The controlling the capturing scheme of the main camera may include controlling tilting or panning of the main camera based on the location of the extracted object of interest, and controlling zooming of the main camera based on the size of the extracted object of interest.

The controlling the tilting or panning of the main camera may include controlling the tilting or panning of the main camera so that the object of interest is located in the center of the first image.

The controlling the zooming of the main camera may include controlling the zooming of the main camera so that the object of interest has a size between a minimum size and a maximum size.

The controlling the capturing scheme of the main camera may further include calculating a distance between the main camera and the object of interest, and controlling the zooming of the main camera based on the distance between the main camera and the object of interest.

The projecting the object of interest onto the second image may include projecting the object of interest onto the second image based on at least one of the location of the extracted object of interest, a distance between the main camera and the object of interest, information of the main camera and a homography.

The controlling the capturing scheme of the sub-camera may include controlling tilting or panning of the sub-camera based on the location of the extracted object of interest and the location of the projected object of interest, and controlling zooming of the sub-camera based on the size of the extracted object of interest and the size of the projected object of interest.

The controlling the tilting or panning of the sub-camera may include controlling the tilting or panning of the sub-camera so that a difference between the location of the extracted object of interest and the location of the projected object of interest is less than or equal to a threshold.

The controlling the zooming of the sub-camera may include controlling the zooming of the sub-camera so that a difference between the size of the extracted object of interest and the size of the projected object of interest is less than or equal to a threshold.

The controlling the capturing scheme of the sub-camera may further include controlling the zooming of the sub-camera based on a difference between a distance between the main camera and the object of interest and a distance between the sub-camera and the object of interest.

According to another aspect, there is provided a multi-camera control apparatus for controlling a main camera and at least one sub-camera, the main camera being configured to capture a moving object of interest and the sub-camera being configured to capture the object of interest at a different viewpoint from that of the main camera, the multi-camera control apparatus including an object-of-interest extractor configured to extract the object of interest from a first image generated by the main camera, a main camera controller configured to control a capturing scheme of the main camera based on a change in a location and a size of the extracted object of interest, an object-of-interest projector configured to project the object of interest onto a second image generated by the sub-camera, and a sub-camera controller configured to control a capturing scheme of the sub-camera based on a change in a location and a size of the projected object of interest.

The main camera controller may be configured to control tilting or panning of the main camera based on the location of the extracted object of interest and to control zooming of the main camera based on the size of the extracted object of interest.

The main camera controller may be configured to control the tilting or panning of the main camera so that the object of interest is located in the center of the first image.

The main camera controller may be configured to control the zooming of the main camera so that the object of interest has a size between a minimum size and a maximum size.

The main camera controller may be configured to calculate a distance between the main camera and the object of interest, and to control the zooming of the main camera based on the distance between the main camera and the object of interest.

The object-of-interest projector may be configured to project the object of interest onto the second image based on at least one of the location of the extracted object of interest, a distance between the main camera and the object of interest, information of the main camera and a homography.

The sub-camera controller may be configured to control tilting or panning of the sub-camera based on the location of the extracted object of interest and the location of the projected object of interest, and to control zooming of the sub-camera based on the size of the extracted object of interest and the size of the projected object of interest.

The sub-camera controller may be configured to control the tilting or panning of the sub-camera so that a difference between the location of the extracted object of interest and the location of the projected object of interest is less than or equal to a threshold.

The sub-camera controller may be configured to control the zooming of the sub-camera so that a difference between the size of the extracted object of interest and the size of the projected object of interest is less than or equal to a threshold.

The sub-camera controller may be configured to control the zooming of the sub-camera based on a difference between a distance between the main camera and the object of interest and a distance between the sub-camera and the object of interest.

EFFECT

According to embodiments of the present invention, a main camera and a sub-camera may be controlled to maintain a constant size and a constant location of an object of interest included in each of a first image acquired by the main camera and a second image acquired by the sub-camera. Thus, it is possible to prevent a viewpoint from unnaturally moving due to a change in a size or a location of the object of interest in each of the first image and the second image when the viewpoint is continuously switched based on the first image and the second image.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
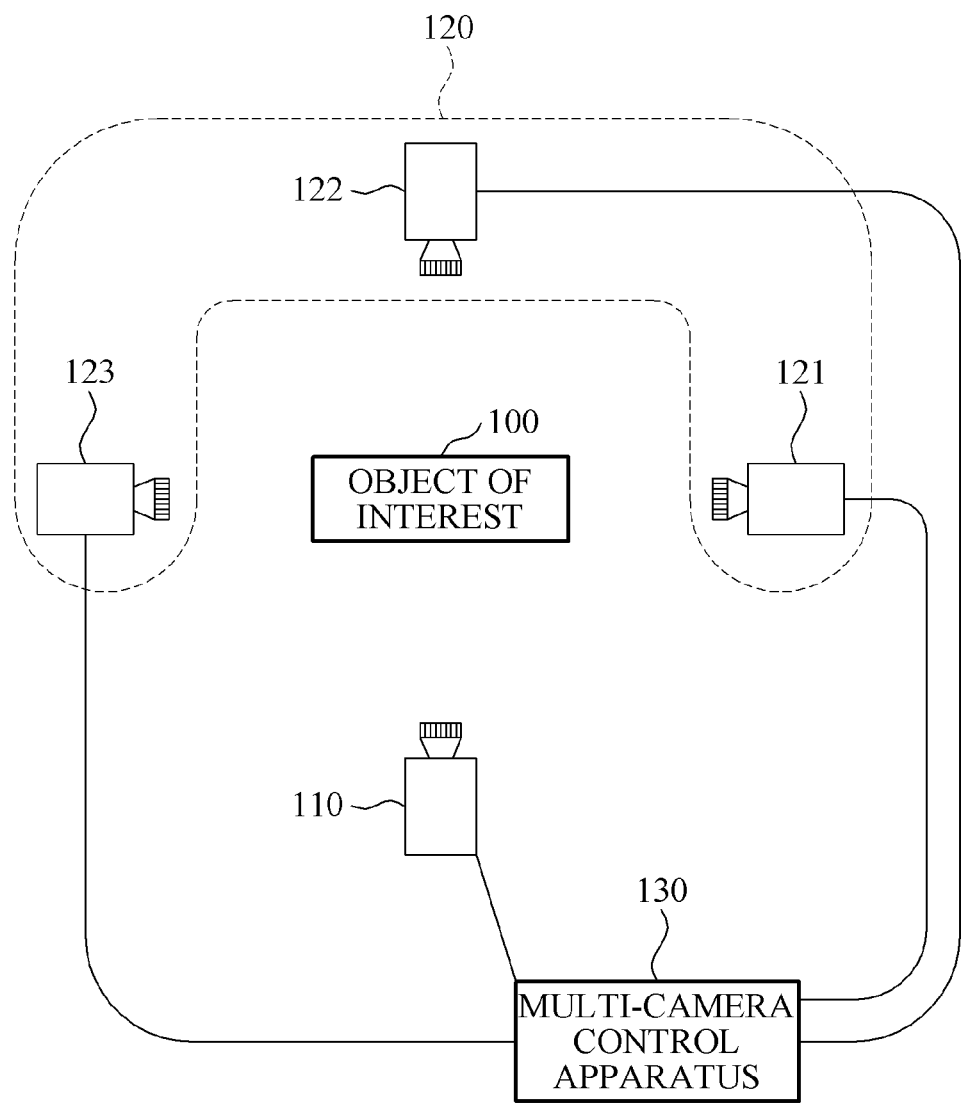
FIG. 1 is a diagram illustrating a multi-camera control apparatus and neighboring devices according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a multi-camera control apparatus 130 and neighboring devices according to an embodiment of the present invention.

Referring to FIG. 1, the multi-camera control apparatus 130 may control a main camera 110 and at least one sub-camera 120, for example, a first sub-camera 121, a second sub-camera 122 and a third sub-camera 123. The main camera 110 and the sub-camera 120 may be configured to capture an object of interest 100, and may be, for example, pan-tilt-zoom (PTZ) cameras.

The main camera 110 may generate a first image by capturing the object of interest 100. The object of interest 100 may be an object, for example, a moving vehicle or person. Also, the main camera 110 may track and capture the object of interest 100 that is moving.

The sub-camera 120 may generate a second image by capturing surroundings of the object of interest 100 at a different viewpoint from that of the main camera 110. For example, when the main camera 110 tracks and captures a pitcher who pitches a ball in a ballpark, the sub-camera 120 may capture the ballpark, the pitcher and other players at different locations and viewpoints of those of the main camera 110. When the main camera 110 captures a front side of the object of interest 100 as shown in FIG. 1, the first sub-camera 121 may capture a left side of the object of interest 100, the second sub-camera 122 may capture a back side of the object of interest 100 and the third sub-camera 123 may capture a right side of the object of interest 100.

Because the main camera 110 and the sub-camera 120 capture the object of interest 100 at different viewpoints and different locations, a size and a location of the object of interest 100 included in the first image may be different from a size and a location of the object of interest 100 included in the second image.

However, when a continuous viewpoint switching service of continuously switching a viewpoint based on a first image and a plurality of second images is provided to a user, the size and the location of the object of interest 100 may change based on the viewpoint. Accordingly, it may be difficult for the user to recognize the object of interest 100 as the same object.

Thus, the multi-camera control apparatus 130 may maintain a constant size and a constant location of the object of interest 100 included in each of the first image and the second images by controlling the main camera 110 and the sub-camera 120.

The multi-camera control apparatus 130 may control tilting or panning of the main camera 110 based on the location of the object of interest 100 included in the first image so that the object of interest 100 may be located in a center of the first image. Also, the multi-camera camera control apparatus 130 may control zooming of the main camera 110 based on the size of the object of interest 100 in the first image so that the object of interest 100 in the first image may remain constant in size.

The multi-camera control apparatus 130 may control tilting, panning or zooming of the sub-camera 120 so that a location and size of the object of interest 100 in the second image may correspond to the location and size of the object of interest 100 in the first image.

The multi-camera control apparatus 130 may control a capturing scheme of each of the main camera 110 and the sub-camera 120 so that the location and the size of the object of interest 100 included in each of the first image and the second image may remain constant. Thus, the multi-camera control apparatus 130 may prevent a viewpoint from unnaturally moving due to a change in the location or the size of the object of interest 100 in each of the first image and the second image when the viewpoint is continuously switched based on the first image and the second image.

Figure 2:
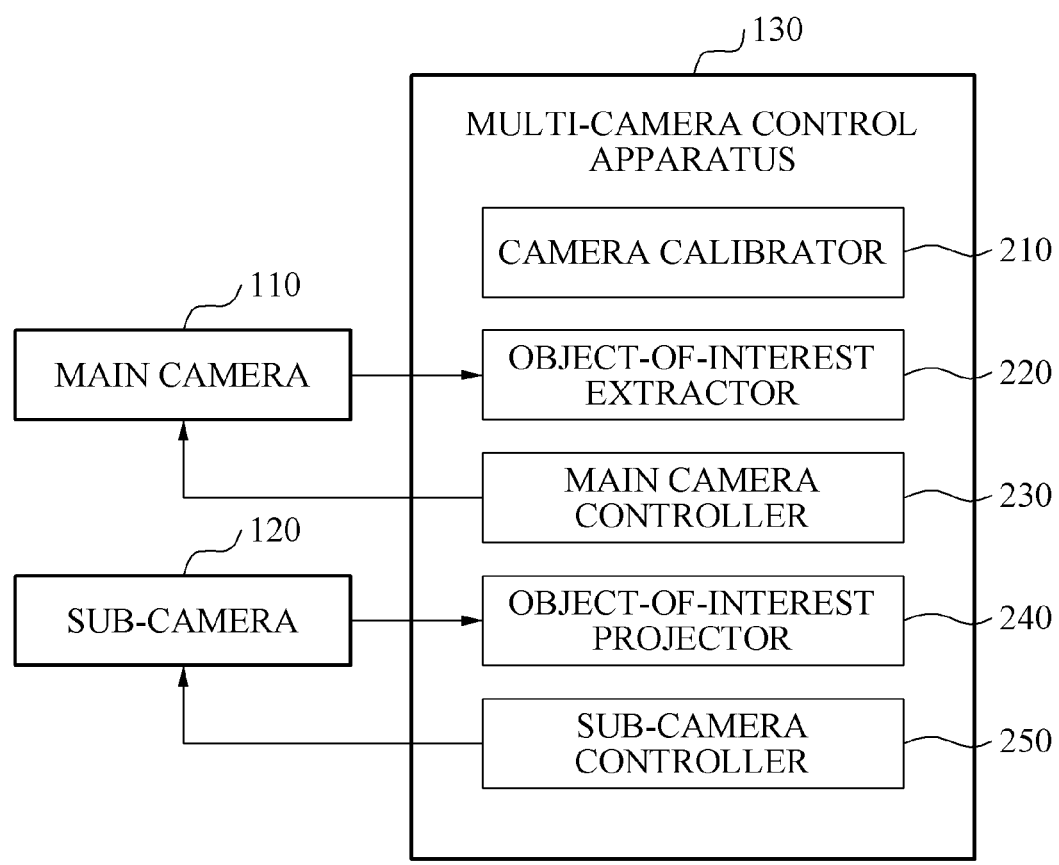
FIG. 2 is a block diagram illustrating a configuration of the multi-camera control apparatus of FIG. 1.

FIG. 2 illustrates a configuration of the multi-camera control apparatus 130 of FIG. 1.

Referring to FIG. 2, the multi-camera control apparatus 130 may include a camera calibrator 210, an object-of-interest extractor 220, a main camera controller 230, an object-of-interest projector 240, and a sub-camera controller 250.

The camera calibrator 210 may set an initial location of each of the main camera 110 and the sub-camera 120. Also, the camera calibrator 210 may calibrate the main camera 110 and the sub-camera 120 of which the initial locations are set, and may calculate a pose parameter or a location parameter of each of the main camera 110 and the sub-camera 120. For example, to calibrate the main camera 110 and the sub-camera 120, the camera calibrator 210 may employ a camera calibration scheme disclosed in the paper titled "A flexible new technique for camera calibration" introduced by Z. Z. Zhang in IEEE Transactions on Pattern Analysis and Machine Intelligence, 22(11): 1330-1334, 2000. Also, an initial pose may include at least one of an initial tilt value and an initial pan value of each of the main camera 110 and the sub-camera 120.

When an initial pose and the initial location of the main camera 110 are determined, the main camera 110 may start to capture an object of interest. A person who controls the main camera 110 may manually track a movement of the object of interest and the main camera 110 may capture the object of interest. Also, the main camera 110 may track the movement of the object of interest using an automatic object tracking device, and may automatically capture the object of interest based on a result of the tracking.

The object-of-interest extractor 220 may receive a first image from the main camera 110. The first image may be generated by the main camera 110 capturing the object of interest. The object-of-interest extractor 220 may extract the object of interest from the received first image. For example, the object-of-interest extractor 220 may identify the object of interest included in the first image, and may extract a size and a location of the identified object of interest.

The main camera controller 230 may control a capturing scheme of the main camera 110 based on a change in a size and a location of the object of interest extracted from the first image by the object-of-interest extractor 220.

The main camera controller 230 may control tilting or panning of the main camera 110 based on the location of the object of interest extracted from the first image. When the location of the object of interest is out of an area set in the center of the first image, the main camera controller 230 may control the tilting or panning of the main camera 110 so that the object of interest may be located in the center of the first image.

For example, when the object of interest moves to a left area in the first image, the main camera controller 230 may control the panning of the main camera 110 to pan the main camera 110 to a left side so that the object of interest may be located in the center of the first image. In another example, when the object of interest moves to an upper area in the first image, the main camera controller 230 may control the tilting of the main camera 110 to tilt the main camera 110 upwards so that the object of interest may be located in the center of the first image.

Also, the main camera controller 230 may control zooming of the main camera 110 based on the size of the object of interest extracted from the first image. The main camera controller 230 may set a minimum size and a maximum size of the object of interest based on a size of the object of interest that is easily identifiable by a user in the first image. For example, when the size of the extracted object of interest is less than the minimum size or greater than the maximum size, the main camera controller 230 may control the zooming of the main camera 110 so that the object of interest may have a size between the minimum size and the maximum size.

For example, when the size of the object of interest included in the first image is less than the minimum size, the main camera controller 230 may control the zooming of the main camera 110 so that the main camera 110 may zoom in and capture the object of interest. Accordingly, the size of the object of interest in the first image may become greater than the minimum size. In another example, when the size of the object of interest in the first image is greater than the maximum size, the main camera controller 230 may control the zooming of the main camera 110 so that the main camera 110 may zoom out and capture the object of interest. Accordingly, the size of the object of interest in the first image may become less than the maximum size.

The main camera 110 may include a distance calculating device configured to calculate a distance between the main camera 110 and the object of interest. The main camera controller 230 may calculate the distance between the main camera 110 and the object of interest using the distance calculating device of the main camera 110. Also, the main camera controller 230 may control the zooming of the main camera 110 based on the distance between the main camera 110 and the object of interest.

For example, when the distance between the main camera 110 and the object of interest increases, the main camera controller 230 may control the zooming of the main camera 110 so that the main camera 110 may zoom in and capture the object of interest, to prevent the size of the object of interest in the first image from being reduced below the minimum size even though the object of interest is distant from the main camera 110. In another example, when the distance between the main camera 110 and the object of interest decreases, the main camera controller 230 may control the zooming of the main camera 110 so that the main camera 110 may zoom out and capture the object of interest, to prevent the size of the object of interest in the first image from becoming greater than the maximum size even though the object of interest is close to the main camera 110.

The object-of-interest projector 240 may project the object of interest extracted from the first image by the object-of-interest extractor 220 onto a second image generated by the sub-camera 120.

The object-of-interest projector 240 may calculate a location and a size of the object of interest included in the second image. Also, the object-of-interest projector 240 may calculate a distance between the sub-camera 120 and the object of interest. For example, when a plurality of sub-cameras 120 are provided, the object-of-interest projector 240 may calculate a location and a size of an object of interest included in a second image for each of the sub-cameras 120.

The object-of-interest projector 240 may project the object of interest extracted from the first image by the object-of-interest extractor 220 onto the second image, based on at least one of the location of the extracted object of interest, the distance between the main camera 110 and the object of interest, information of the main camera 110 and a homography. The information of the main camera 110 may include, for example, initial information set by the camera calibrator 210, or a tilt value, a pan value and a zoom value of the main camera 110 controlled by the main camera controller 230.

The location of the object of interest projected onto the second image may be calculated based on extraction of an area of the object of interest by feature points or template matching, or a three-dimensional (3D) projection by measurement of a distance to an object.

The sub-camera controller 250 may control a capturing scheme of the sub-camera 120 based on a change in the size and the location of the object of interest projected onto the second image.

The sub-camera controller 250 may control tilting or panning of the sub-camera 120 based on the location of the object of interest in the first image and the location of the object of interest projected onto the second image. When a difference between the location of the object of interest projected onto the second image and the location of the object of interest in the first image is equal to or greater than a preset location threshold, the sub-camera controller 250 may control the tilting or panning of the sub-camera 120 so that the difference may be reduced below the location threshold.

For example, when the object of interest projected onto the second image is located further to the left than the object of interest in the first image, the sub-camera controller 250 may control the panning of the sub-camera 120 to pan the sub-camera 120 to the left side so that the object of interest may be located in the center of the second image. In another example, when the object of interest projected onto the second image is located further upward than the object of interest in the first image, the sub-camera controller 250 may control the tilting of the sub-camera 120 to tilt the sub-camera 120 upwards so that the object of interest may be located in the center of the second image.

Also, the sub-camera controller 250 may control zooming of the sub-camera 120 based on the size of the object of interest in the first image and the size of the object of interest projected onto the second image.

The sub-camera controller 250 may control the zooming of the sub-camera 120 so that a difference between the size of the object of interest projected onto the second image and the size of the object of interest in the first image may be equal to or less than a threshold. For example, when a ratio between the size of the object of interest in the first image and the size of the object of interest projected onto the second image is equal to or greater than a preset threshold ratio, the sub-camera controller 250 may control the zooming of the sub-camera 120 based on the ratio.

For example, when the ratio is greater than the threshold ratio and when the size of the object of interest projected onto the second image is less than the size of the object of interest in the first image, the sub-camera controller 250 may control the zooming of the sub-camera 120 so that the sub-camera 120 may zoom in and capture the object of interest, to maintain the difference between the size of the object of interest projected onto the second image and the size of the object of interest in the first image to be equal to or less than the threshold ratio. In another example, when the ratio is less than the threshold ratio, the sub-camera controller 250 may not control the zooming of the sub-camera 120.

For example, the sub-camera 120 may include a distance calculating device configured to calculate a distance between the sub-camera 120 and the object of interest. In this example, the sub-camera controller 250 may calculate the distance between the sub-camera 120 and the object of interest using the distance calculating device. Also, the sub-camera controller 250 may control the zooming of the sub-camera 120 based on the distance between the sub-camera 120 and the object of interest.

For example, when the distance between the sub-camera 120 and the object of interest increases, the sub-camera controller 250 may control the zooming of the sub-camera 120 so that the sub-camera 120 may zoom in and capture the object of interest, to prevent the size of the object of interest in the first image from being reduced below the minimum size even though the object of interest is distant from the sub-camera 120. In another example, when the distance between the sub-camera 120 and the object of interest decreases, the sub-camera controller 250 sub may control the zooming of the sub-camera 120 so that the sub-camera 120 may zoom out and capture the object of interest, to prevent the size of the object of interest in the first image from becoming greater than the maximum size even though the object of interest is close to the sub-camera 120.

In other words, the sub-camera controller 250 may control the sub-camera 120, to maintain the difference between the location of the object of interest projected onto the second image and the location of the object of interest in the first image to be equal to or less than the location threshold, and to maintain the difference between the size of the object of interest projected onto the second image and the size of the object of interest in the first image to be equal to or less than the threshold, based on the size and the location of the object of interest in the first image. Accordingly, the multi-camera control apparatus 130 may prevent a size and a location of an object from rapidly changing based on switching of multiple viewpoints in a continuous viewpoint switching service of continuously switching multiple viewpoints based on a first image and a second image, and thus it is possible to achieve natural viewpoint switching.

Figure 3:
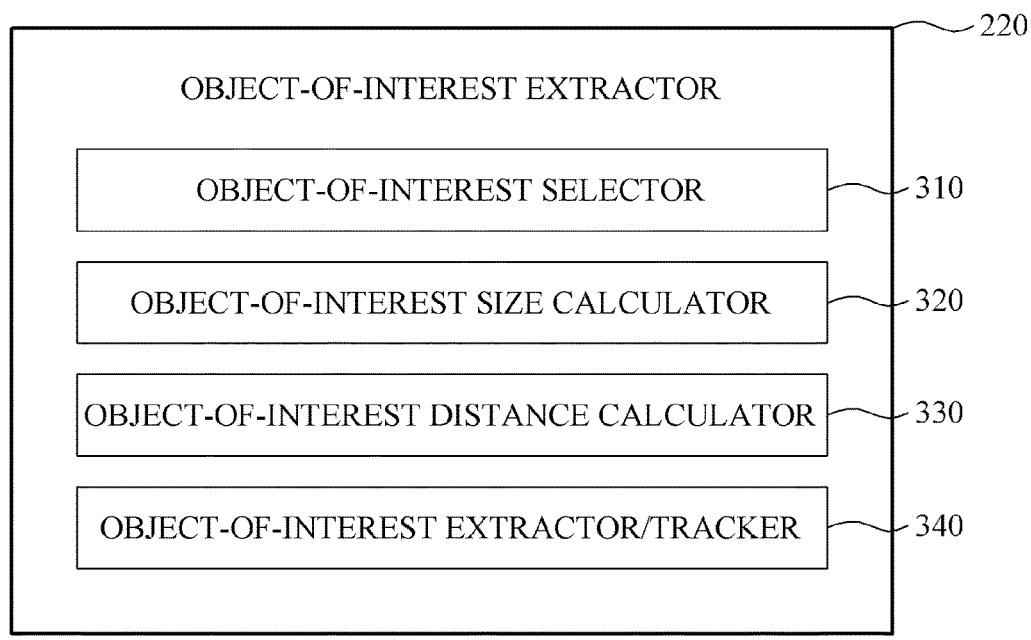
FIG. 3 is a block diagram illustrating a configuration of an object-of-interest extractor of FIG. 2.

FIG. 3 illustrates a configuration of the object-of-interest extractor 220 of FIG. 2.

Referring to FIG. 3, the object-of-interest extractor 220 may include an object-of-interest selector 310, an object-of-interest size calculator 320, an object-of-interest distance calculator 330, and an object-of-interest extractor and tracker (extractor/tracker) 340.

The object-of-interest selector 310 may identify objects each having a size equal to or greater than a preset size among objects captured by the main camera 110. Also, the object-of-interest selector 310 may provide a user with an interface to select an object of interest of which movement is to be tracked from among the identified objects. For example, the object-of-interest selector 310 may display shapes of the identified objects to the user, and may determine an object selected by the user from among the displayed objects as an object of interest.

The object-of-interest size calculator 320 may calculate a size of an object of interest included in the first image. For example, the object-of-interest size calculator 320 may calculate the size of the object of interest based on a number of pixels used to display the object of interest on the first image.

When the main camera 110 includes a distance calculating device configured to calculate the distance between the main camera 110 and the object of interest, the object-of-interest distance calculator 330 may calculate the distance between the main camera 110 and the object of interest using the distance calculating device of the main camera 110.

The object-of-interest extractor/tracker 340 may track the object of interest that is displayed on the first image and of which the location changes based on a movement of the object of interest, and may extract the object of interest at the changed location.

Figure 4:
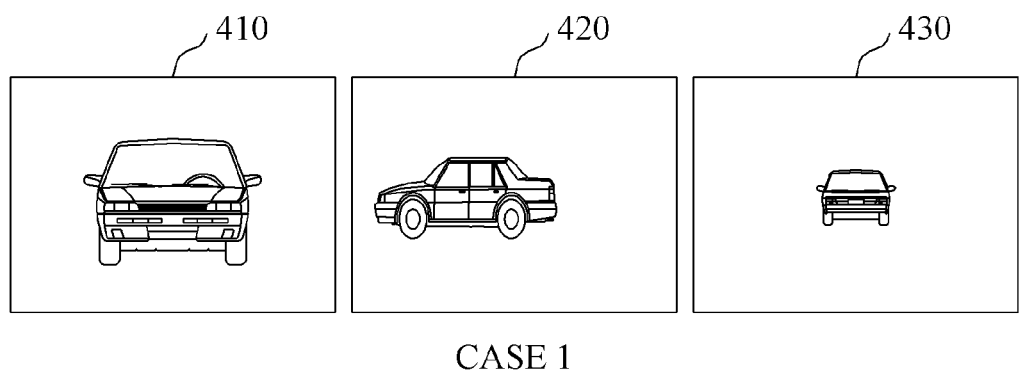
FIG. 4 is a diagram illustrating an example of a result of controlling multiple cameras according to an embodiment of the present invention.
Figure 4:
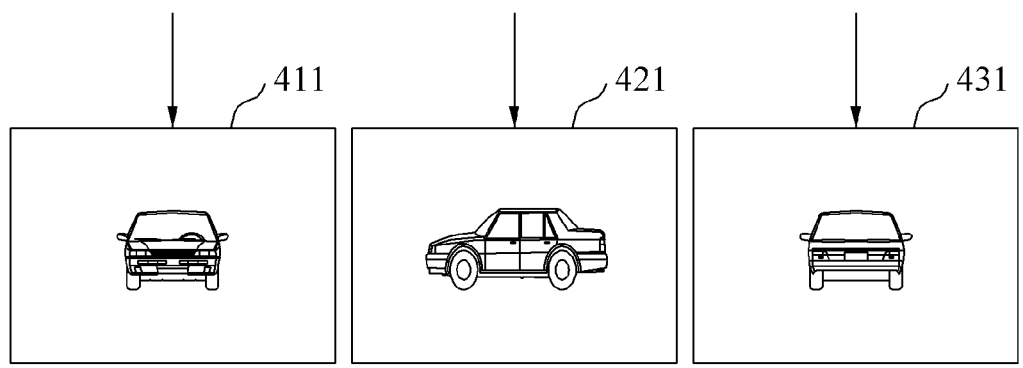

FIG. 4 illustrates an example of a result of controlling multiple cameras according to an embodiment of the present invention.

Referring to FIG. 4, in case 1, a vehicle determined as an object of interest moves towards the main camera 110. In the case 1, images 410, 420 and 430 may be acquired by the main camera 110, the first sub-camera 121 and the second sub-camera 122, respectively.

When the object of interest approaches the main camera 110, a size of the object of interest included in the image 410 may increase as shown in FIG. 4. Because the first sub-camera 121 is located in a side of the object of interest, the object of interest may appear towards a left side of the image 420 based on a movement of the object of interest as shown in FIG. 4. Because the second sub-camera 122 is located in a back side of the object of interest, when the object of interest moves towards the main camera 110, the second sub-camera 122 may become distant from the object of interest and a size of the object of interest in the image 430 may decrease as shown in FIG. 4.

When a continuous viewpoint switching service based on the images 410 through 430 is provided to a user, the user may feel that the size of the object of interest changes due to a change in a viewpoint, because the size of the object of interest included in the image 410 is different from the size of the object of interest included in the image 430.

The object of interest may appear in the center of each of the images 410 and 430. In the image 420, the object of interest may appear in the left side. When a viewpoint changes in an order of the images 410 through 430, the user may feel that the object of interest moves from the center to the left side and back to the center.

Accordingly, as shown in case 2 of FIG. 4, the multi-camera control apparatus 130 may control the main camera 110, the first sub-camera 121 and the second sub-camera 122 so that the object of interest may be maintained at a constant size and a constant location in an image 411 acquired by the main camera 110, an image 421 acquired by the first sub-camera 121 and an image 431 acquired by the second sub-camera 122.

The multi-camera control apparatus 130 may control the zooming of the main camera 110 so that the main camera 110 may zoom out and capture the object of interest. Accordingly, the size of the object of interest included in the image 411 may be maintained, instead of increasing based on a movement of the object of interest.

In addition, the multi-camera control apparatus 130 may control panning of the first sub-camera 121 to pan the first sub-camera 121 to a left side so that the object of interest may be located in the center of the image 421. In other words, because the object of interest included in each of the images 411 and 421 is located in the center of each of the images 411 and 421, the location of the object of interest may remain unchanged to be recognized by the user even through the image 411 is switched to the image 421.

Furthermore, the multi-camera control apparatus 130 may control zooming of the second sub-camera 122 so that the second sub-camera 122 may zoom in and capture the object of interest, to maintain a constant size of the object of interest included in the image 431. Accordingly, the object of interest included in each of the images 411 through 431 may have similar sizes as shown in FIG. 4. In other words, the size of the object of interest may remain unchanged to be recognized by the user even through the image 411 is switched to the image 421 and the image 421 is switched to the image 431.

Figure 5:
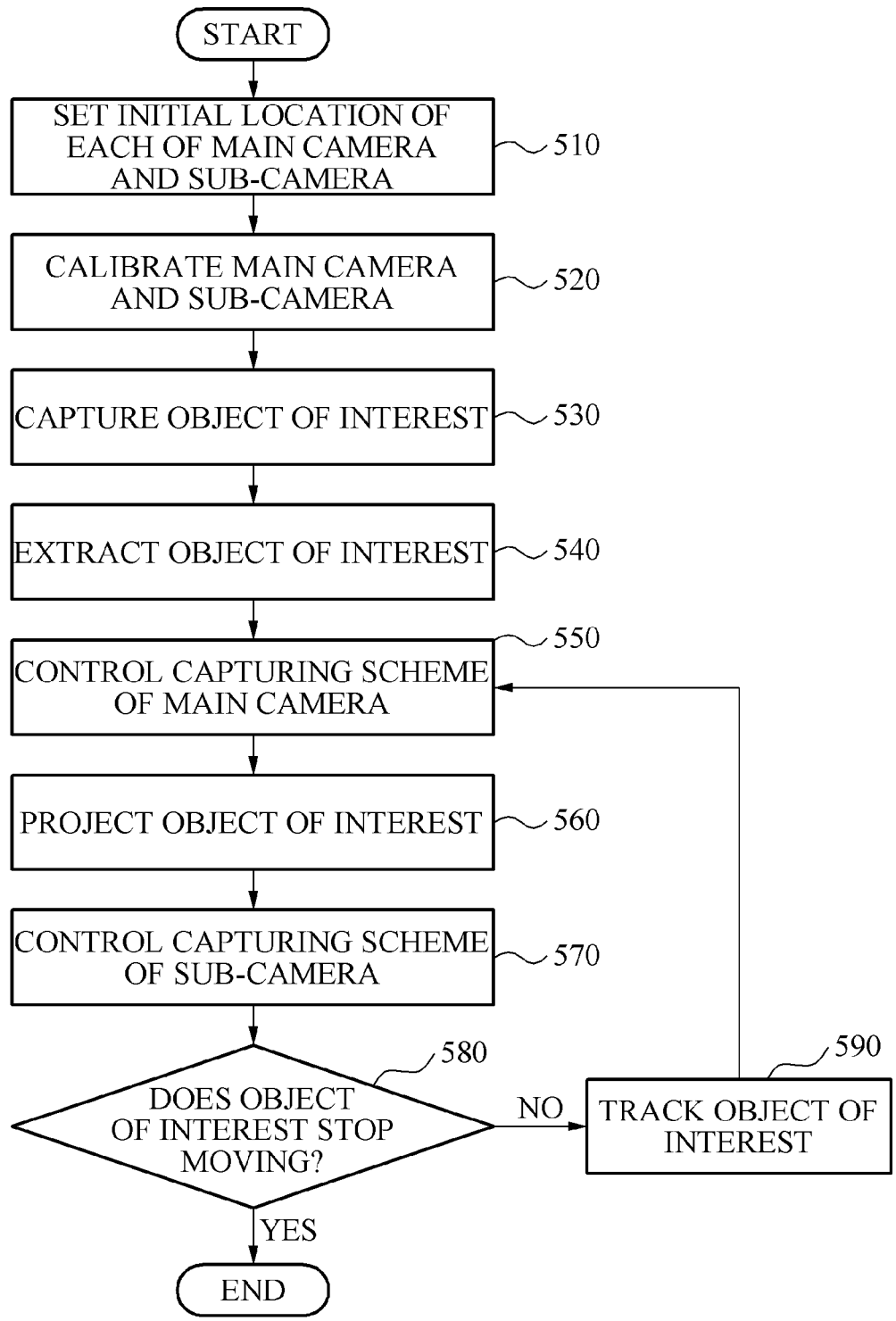
FIG. 5 is a flowchart illustrating a multi-camera control method according to an embodiment of the present invention.

FIG. 5 is a flowchart illustrating a multi-camera control method according to an embodiment of the present invention. The multi-camera control method of FIG. 5 may be performed by, for example, the multi-camera control apparatus 130 shown in FIG. 2.

Referring to FIG. 5, in operation 510, the camera calibrator 210 may set an initial location of each of the main camera 110 and the sub-camera 120.

In operation 520, the camera calibrator 210 may calibrate the main camera 110 and the sub-camera 120 of which the initial locations are set in operation 510, and may calculate a pose parameter or a location parameter of each of the main camera 110 and the sub-camera 120.

In operation 530, the main camera 110 may start to capture an object of interest. For example, a person who controls the main camera 110 may manually track a movement of the object of interest and the main camera 110 may capture the object of interest. Also, the main camera 110 may track the movement of the object of interest using an automatic object tracking device, and may automatically capture the object of interest based on a result of the tracking.

In operation 540, the object-of-interest extractor 220 may receive a first image from the main camera 110. The first image may be generated by the main camera 110 capturing the object of interest in operation 530. In operation 540, the object-of-interest extractor 220 may extract the object of interest from the received first image. For example, the object-of-interest extractor 220 may identify the object of interest included in the first image, and may extract a size and a location of the identified object of interest.

In operation 550, the main camera controller 230 may control a capturing scheme of the main camera 110 based on a change in the size and the location of the object of interest extracted from the first image.

The main camera controller 230 may control tilting or panning of the main camera 110 based on the location of the object of interest extracted from the first image. Also, the main camera controller 230 may control zooming of the main camera 110 based on the size of the object of interest extracted from the first image.

In addition, the main camera 110 may include a distance calculating device configured to calculate a distance between the main camera 110 and the object of interest. The main camera controller 230 may calculate the distance between the main camera 110 and the object of interest using the distance calculating device of main camera 110. Also, the main camera controller 230 may control the zooming of the main camera 110 based on the distance between the main camera 110 and the object of interest.

In operation 560, the object-of-interest projector 240 may project the object of interest extracted from the first image onto a second image generated by the sub-camera 120. For example, the object-of-interest projector 240 may calculate a location and a size of the object of interest included in a second image for each of sub-cameras 120. Also, the object-of-interest projector 240 may calculate a distance between each of the sub-cameras 120 and the object of interest.

The object-of-interest projector 240 may project the object of interest extracted from the first image by the object-of-interest extractor 220 onto the second image, based on at least one of the location of the extracted object of interest, the distance between the main camera 110 and the object of interest, information of the main camera 110 and a homography.

In operation 570, the sub-camera controller 250 may control a capturing scheme of the sub-camera 120 based on a change in the size and the location of the object of interest projected onto the second image.

The sub-camera controller 250 may control tilting or panning of the sub-camera 120 based on the location of the object of interest in the first image and the location of the object of interest projected onto the second image. Also, the sub-camera controller 250 may control zooming of the sub-camera 120 based on the size of the object of interest in the first image and the size of the object of interest projected onto the second image.

For example, the sub-camera 120 may include a distance calculating device configured to calculate a distance between the sub-camera 120 and the object of interest. In this example, the sub-camera controller 250 may calculate the distance between the sub-camera 120 and the object of interest using the distance calculating device. Also, the sub-camera controller 250 may control the zooming of the sub-camera 120 based on the distance between the sub-camera 120 and the object of interest.

In operation 580, the object-of-interest extractor 220 may determine whether the object of interest stops moving. In an example, when the object of interest stops moving or when a capturing operation of the main camera 110 is terminated, the multi-camera control apparatus 130 may terminate the multi-camera control method. In another example, when the object of interest continues to move, the object-of-interest extractor 220 may perform operation 590.

In operation 590, the object-of-interest extractor 220 may track a location of the object of interest in the first image. The location of the object of interest may change based on a movement of the object of interest. Also, the object-of-interest extractor 220 may calculate a size of the object of interest at the tracked location and may calculate the distance between the main camera 110 and the object of interest. In operation 550, the main camera controller 230 may control the main camera 110, based on the tracked location of the object of interest, the calculated size of the object of interest and the calculated distance.

Figure 6:
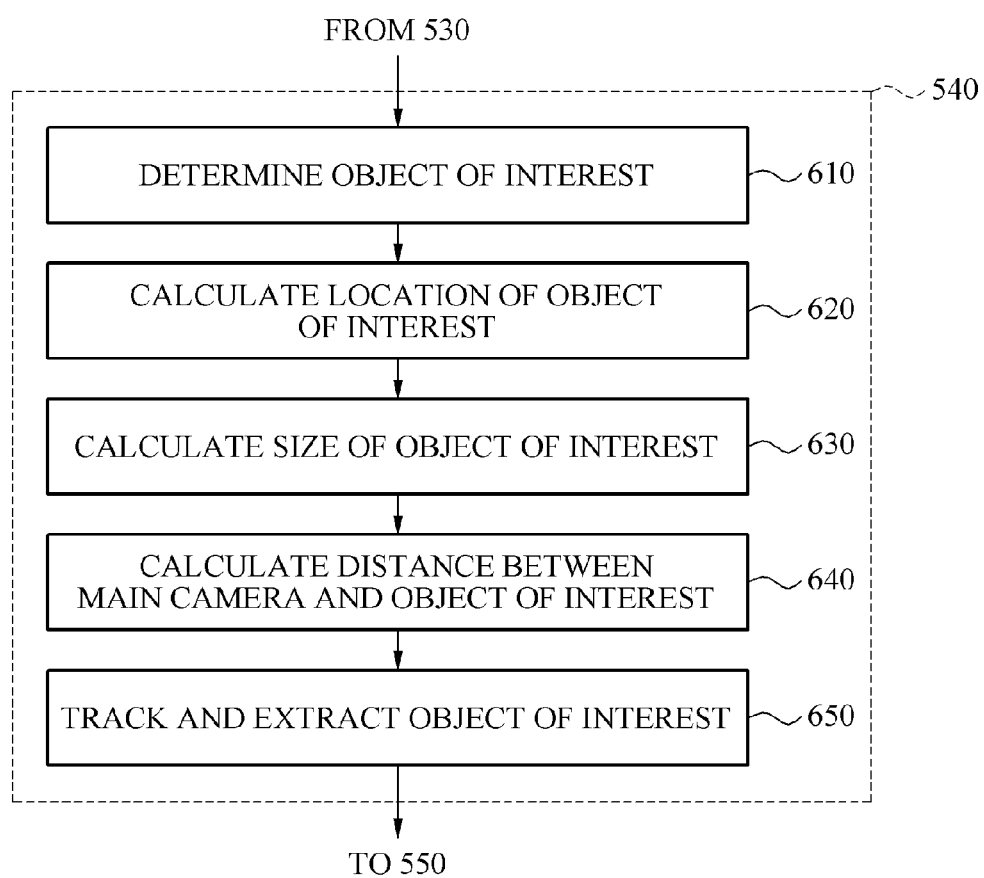
FIG. 6 is a flowchart illustrating an operation of extracting an object of interest in the multi-camera control method of FIG. 5.

FIG. 6 illustrates operation 540 of FIG. 5. Operation 540 may include operations 610 through 650 of FIG. 6.

Referring to FIG. 6, in operation 610, the object-of-interest selector 310 may identify objects each having a size equal to or greater than a preset size among objects captured by the main camera 110. Also, the object-of-interest selector 310 may provide a user with an interface to select an object of interest of which movement is to be tracked from among the identified objects. For example, the object-of-interest selector 310 may display shapes of the identified objects to the user, and may determine an object selected by the user from among the displayed objects as an object of interest.

In operation 620, the object-of-interest selector 310 may calculate a location of the object determined as the object of interest.

In operation 630, the object-of-interest size calculator 320 may calculate a size of the object of interest included in the first image. For example, the object-of-interest size calculator 320 may calculate the size of the object of interest based on a number of pixels used to display the object of interest on the first image.

In operation 640, the object-of-interest distance calculator 330 may calculate the distance between the main camera 110 and the object of interest using the distance calculating device of the main camera 110.

In operation 650, the object-of-interest extractor/tracker 340 may track the object of interest that is displayed on the first image and of which the location changes based on a movement of the object of interest, and may extract the object of interest at the changed location.

Figure 7:
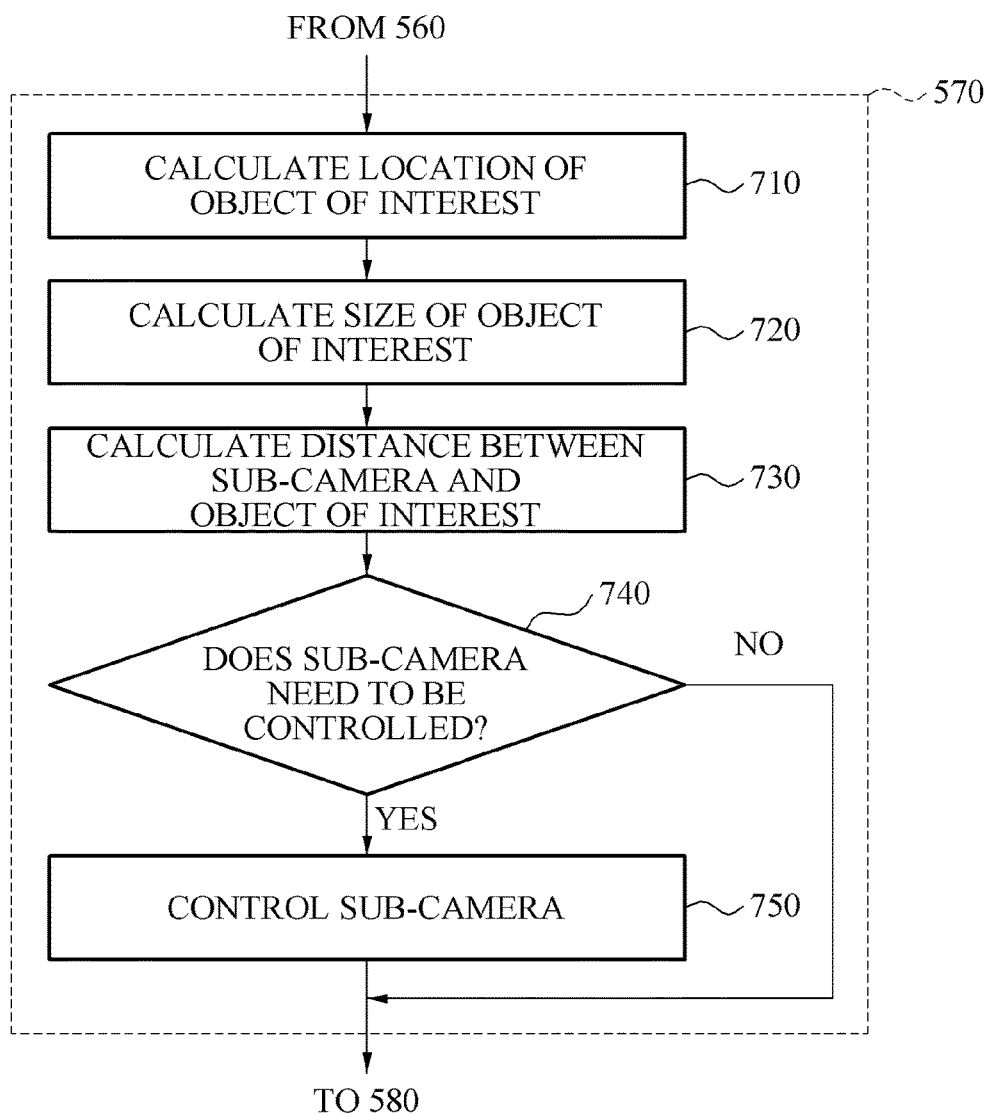
FIG. 7 is a flowchart illustrating an operation of controlling a sub-camera in the multi-camera control method of FIG. 5.

FIG. 7 illustrates operation 570 of FIG. 5. Operation 570 may include operations 710 through 750 of FIG. 7.

Referring to FIG. 7, in operation 710, the object-of-interest projector 240 may calculate a location of an object of interest included in a second image for each of sub-cameras 120.

In operation 720, the object-of-interest projector 240 may calculate a size of the object of interest included in the second image for each of the sub-cameras 120.

In operation 730, the object-of-interest projector 240 may calculate a distance between each of the sub-cameras 120 and the object of interest.

In operation 740, the sub-camera controller 250 may determine whether the sub-camera 120 needs to be controlled, based on a difference between the location calculated in operation 710 and the location of the object of interest extracted from the first image, a difference between the size calculated in operation 720 and the size of the object of interest extracted from the first image, or a change in the distance calculated in operation 730.

For example, when a difference between the location of the object of interest projected onto the second image and the location of the object of interest in the first image is equal to or greater than a preset location threshold, or when a ratio between the size of the object of interest in the first image and the size of the object of interest projected onto the second image is equal to or greater than a preset threshold ratio, the sub-camera controller 250 may determine that the sub-camera 120 needs to be controlled.

When the distance between the sub-camera 120 and the object of interest changes, the sub-camera controller 250 may determine that the sub-camera 120 needs to be controlled.

In operation 750, the sub-camera controller 250 may control tilting or panning of the sub-camera 120 based on the location of the object of interest in the first image and the location of the object of interest projected onto the second image. Also, the sub-camera controller 250 may control zooming of the sub-camera 120 based on the size of the object of interest in the first image and the size of the object of interest projected onto the second image.

For example, the sub-camera 120 may include a distance calculating device configured to calculate the distance between the sub-camera 120 and the object of interest. In this example, the sub-camera controller 250 may calculate the distance between the sub-camera 120 and the object of interest using the distance calculating device. Also, the sub-camera controller 250 may control the zooming of the sub-camera 120 based on the distance between the sub-camera 120 and the object of interest.

According to embodiments of the present invention, a main camera and a sub-camera may be controlled to maintain a constant size and a constant location of an object of interest included in each of a first image acquired by the main camera and a second image acquired by the sub-camera. Thus, it is possible to prevent a viewpoint from unnaturally moving due to a change in a size or a location of the object of interest in each of the first image and the second image when the viewpoint is continuously switched based on the first image and the second image.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A multi-camera control method of controlling a main camera and at least one sub-camera, the main camera being configured to capture a moving object of interest and the sub-camera being configured to capture the object of interest at a different viewpoint from that of the main camera, the multi-camera control method comprising:
    extracting the object of interest from a first image generated by the main camera;
    controlling a capturing scheme of the main camera based on a change in a location and a size of the extracted object of interest;
    projecting the object of interest onto a second image generated by the sub-camera; and
    controlling a capturing scheme of the sub-camera based on a change in a location and a size of the projected object of interest.

2. The multi-camera control method of claim 1, wherein the controlling the capturing scheme of the main camera comprises:
    controlling tilting or panning of the main camera based on the location of the extracted object of interest; and
    controlling zooming of the main camera based on the size of the extracted object of interest.

3. The multi-camera control method of claim 2, wherein the controlling the tilting or panning of the main camera comprises controlling the tilting or panning of the main camera so that the object of interest is located in the center of the first image.

4. The multi-camera control method of claim 2, wherein the controlling the zooming of the main camera comprises controlling the zooming of the main camera so that the object of interest has a size between a minimum size and a maximum size.

5. The multi-camera control method of claim 2, wherein the controlling the capturing scheme of the main camera further comprises:
    calculating a distance between the main camera and the object of interest; and
    controlling the zooming of the main camera based on the distance between the main camera and the object of interest.

6. The multi-camera control method of claim 1, wherein the projecting the object of interest onto the second image comprises projecting the object of interest onto the second image based on at least one of the location of the extracted object of interest, a distance between the main camera and the object of interest, information of the main camera and a homography.

7. The multi-camera control method of claim 1, wherein the controlling the capturing scheme of the sub-camera comprises:
    controlling tilting or panning of the sub-camera based on the location of the extracted object of interest and the location of the projected object of interest; and
    controlling zooming of the sub-camera based on the size of the extracted object of interest and the size of the projected object of interest.

8. The multi-camera control method of claim 7, wherein the controlling the tilting or panning of the sub-camera comprises controlling the tilting or panning of the sub-camera so that a difference between the location of the extracted object of interest and the location of the projected object of interest is less than or equal to a threshold.

9. The multi-camera control method of claim 7, wherein the controlling the zooming of the sub-camera comprises controlling the zooming of the sub-camera so that a difference between the size of the extracted object of interest and the size of the projected object of interest is less than or equal to a threshold.

10. The multi-camera control method of claim 7, wherein the controlling the capturing scheme of the sub-camera further comprises controlling the zooming of the sub-camera based on a difference between a distance between the main camera and the object of interest and a distance between the sub-camera and the object of interest.

11. A multi-camera control apparatus for controlling a main camera and at least one sub-camera, the main camera being configured to capture a moving object of interest and the sub-camera being configured to capture the object of interest at a different viewpoint from that of the main camera, the multi-camera control apparatus comprising:
    an object-of-interest extractor configured to extract the object of interest from a first image generated by the main camera;
    a main camera controller configured to control a capturing scheme of the main camera based on a change in a location and a size of the extracted object of interest;
    an object-of-interest projector configured to project the object of interest onto a second image generated by the sub-camera; and
    a sub-camera controller configured to control a capturing scheme of the sub-camera based on a change in a location and a size of the projected object of interest.

12. The multi-camera control apparatus of claim 11, wherein the main camera controller is configured to control tilting or panning of the main camera based on the location of the extracted object of interest and to control zooming of the main camera based on the size of the extracted object of interest.

13. The multi-camera control apparatus of claim 12, wherein the main camera controller is configured to control the tilting or panning of the main camera so that the object of interest is located in the center of the first image.

14. The multi-camera control apparatus of claim 12, wherein the main camera controller is configured to control the zooming of the main camera so that the object of interest has a size between a minimum size and a maximum size.

15. The multi-camera control apparatus of claim 12, wherein the main camera controller is configured to calculate a distance between the main camera and the object of interest, and to control the zooming of the main camera based on the distance between the main camera and the object of interest.

16. The multi-camera control apparatus of claim 11, wherein the object-of-interest projector is configured to project the object of interest onto the second image based on at least one of the location of the extracted object of interest, a distance between the main camera and the object of interest, information of the main camera and a homography.

17. The multi-camera control apparatus of claim 11, wherein the sub-camera controller is configured to control tilting or panning of the sub-camera based on the location of the extracted object of interest and the location of the projected object of interest, and to control zooming of the sub-camera based on the size of the extracted object of interest and the size of the projected object of interest.

18. The multi-camera control apparatus of claim 17, wherein the sub-camera controller is configured to control the tilting or panning of the sub-camera so that a difference between the location of the extracted object of interest and the location of the projected object of interest is less than or equal to a threshold.

19. The multi-camera control apparatus of claim 17, wherein the sub-camera controller is configured to control the zooming of the sub-camera so that a difference between the size of the extracted object of interest and the size of the projected object of interest is less than or equal to a threshold.

20. The multi-camera control apparatus of claim 17, wherein the sub-camera controller is configured to control the zooming of the sub-camera based on a difference between a distance between the main camera and the object of interest and a distance between the sub-camera and the object of interest.

* * * * *